Oct. 18, 1927.
M. BENNINGER
1,645,516
PEELING MACHINE
Filed April 10, 1926
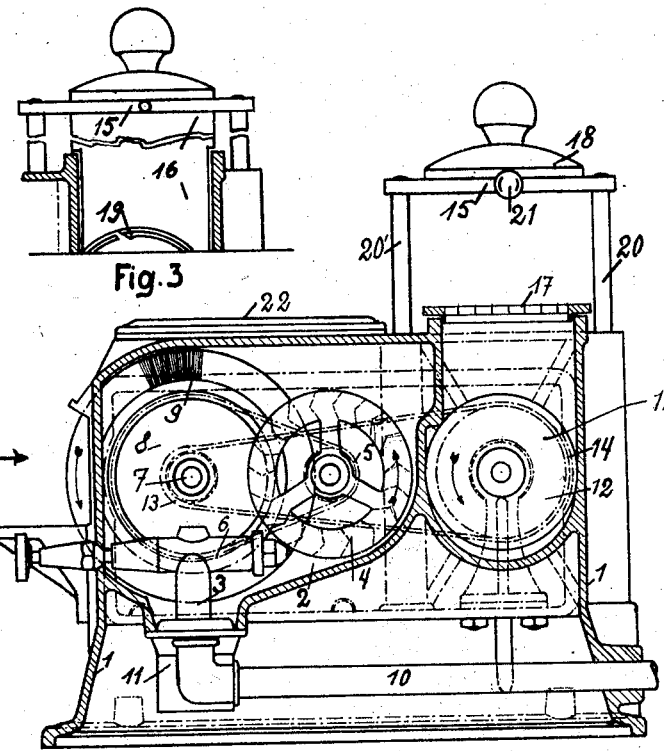
Fig. 3
Fig. 1
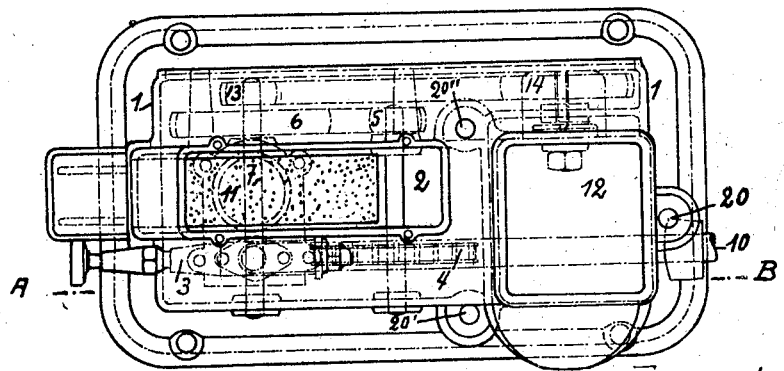
Fig. 2
Inventor
Mario Benninger
by
Attorney Patented Oct. 18, 1927.

1,645,516

UNITED STATES PATENT OFFICE.

MARIO BENNINGER, OF RHEINECK, ST. GALL, SWITZERLAND.

PEELING MACHINE.

Application filed April 10, 1926, Serial No. 101,061, and in Switzerland April 6, 1925.

The present invention relates to improvements in vegetable peeling machines.

The object of my invention is to combine a peeling machine having peeling means of novel construction, together with devices for either cutting the vegetables into pieces or scraping or shredding them, as desired.

My invention will be best understood, when described in connection with the accompanying drawing, in which Fig. 1 shows schematically a front elevation, partly in section, Fig. 2 a top view, some parts left off and Fig. 3 shows a detail.

According to the invention, 1 represents the machine frame in which chambers 2 and 12 are disposed. The chamber 2 contains a driving device, consisting of an injector 3 and a turbine 4 transmitting rotation to the shaft 7 by means of the pulleys 5 and 6. Shaft 7 carries a brushing device made up of the hub 8 and interchangeable brushes 9. The injector 3 is a controllable free-jet injector and receives pressure-water from the inlet pipe 10, connected to a water-conduit by any (not shown) connection. After the water has passed through the turbine, it is used to wet the brushes and withdraw the refuse through the outlet 11 to a (not shown) sink.

Adjacent to the chamber 2 a chamber 12 is provided, containing interchangeable cutting, shredding or scraping drums 12' respectively rotated through the shaft 7 by means of the pulleys 13 and 14. Above the drums the chamber 12 is formed to take up parting or slicing plates 17, which, in connection with a removable pressure head 18 serve to cut the goods into pieces of desired size. The pressure head is seated on a frame, consisting of a plate 15 and guide-bars 20, 20' and 20'', slidably connected to the drum chamber 12. The pressure head can be fixed to the frame by means of a pin 21.

When using the drums for cutting or rasping the goods, a sliding head 16 of the form according to Fig. 3 is employed, which is loosely introduced into the drum chamber 12 containing the drum 19.

The machine frame 1 is provided with top- and side-openings for the introduction and discharge of the goods, the said top opening being closed by a cover 22.

It will be seen from the above that the peeling process can be carried out at the same time as the cutting or rasping process, thus showing the numerous uses for which the machine can be employed.

The operation of the machine is as follows:

Potatoes, beets, etc., may be peeled, on removal of cover 22, by holding and turning them about in the hand while pressing them against the rotating brushes 9 or by introducing the potatoes through the top opening and allowing them to be fed toward the side opening in the direction of the arrow, Fig. 1, so that during their course of travel they will be peeled by the action of the brushes.

In order to part, cut or scrape vegetables they are either put upon the plates 17 and parted by pressing down the pressure head 18 or by placing them into the chamber 12 upon the drums (19, Fig. 3) and loosely introducing the sliding head 16 into the chamber 12.

What I claim is:

A peeling machine comprising, in combination, a frame having a chamber therein, said chamber being provided at its bottom with a waste outlet, a rotary peeler provided with peeling brushes mounted in said chamber, a turbine wheel mounted in said chamber, a driving connection between the turbine wheel and the peeling brush, and an injector nozzle extending into said chamber for supplying water to actuate the turbine wheel and wet the brushes, the waste outlet being positioned for the discharge by gravity of the peelings removed by the brushes with the waste water.

MARIO BENNINGER.